(12) United States Patent
Hlavacek et al.

(10) Patent No.: US 10,351,317 B2
(45) Date of Patent: Jul. 16, 2019

(54) METERING AND POURING DEVICE FOR FLOWABLE SUBSTANCES AND CONTAINER EQUIPPED WITH SUCH A METERING AND POURING DEVICE

(71) Applicant: ALPLA WERKE ALWIN LEHNER GMBH & CO. KG, Hard (AT)

(72) Inventors: Thomas Hlavacek, Bregenz (AT); Oliver Hoch, Altach (AT)

(73) Assignee: ALPLA WERKE ALWIN LEHNER GMBH & CO. KG, Hard (AT)

( * ) Notice: Subject to any disclaimer, the term of this patent is extended or adjusted under 35 U.S.C. 154(b) by 0 days.

(21) Appl. No.: 15/699,512

(22) Filed: Sep. 8, 2017

(65) Prior Publication Data
US 2017/0369215 A1   Dec. 28, 2017

Related U.S. Application Data

(63) Continuation of application No. PCT/EP2016/054748, filed on Mar. 7, 2016.

(30) Foreign Application Priority Data

Mar. 11, 2015   (CH) ...................... 0336/15

(51) Int. Cl.
    *G01F 11/26*   (2006.01)
    *B65D 47/24*   (2006.01)
    (Continued)

(52) U.S. Cl.
    CPC ........... *B65D 47/241* (2013.01); *B65D 41/26* (2013.01); *B65D 47/266* (2013.01); *B65D 51/28* (2013.01); *G01F 11/262* (2013.01); *G01F 11/263* (2013.01)

(58) Field of Classification Search
    CPC .. B65D 47/266; B65D 47/263; B65D 47/261; B65D 47/26; B65D 47/241; B65D 51/28;
    (Continued)

(56) References Cited

U.S. PATENT DOCUMENTS

| 532,990 | A | * | 1/1895 | Rau | ...................... B65D 47/263 |
|---|---|---|---|---|---|
|  |  |  |  |  | 222/537 |
| 575,610 | A | * | 1/1897 | Malcom | .................. G01F 11/24 |
|  |  |  |  |  | 222/362 |

(Continued)

FOREIGN PATENT DOCUMENTS

| EP | 1 717 158 A1 | 11/2006 |
|---|---|---|
| GB | 1 080 186 A | 8/1967 |

OTHER PUBLICATIONS

International Search Report (PCT/ISA/210) dated Jun. 13, 2016, by the European Patent Office as the International Searching Authority for International Application No. PCT/EP2016/054748.

(Continued)

*Primary Examiner* — Patrick M. Buechner
(74) *Attorney, Agent, or Firm* — Buchanan Ingersoll & Rooney PC

(57) ABSTRACT

A metering and pouring device for flowable substances including a holding part having an inside jacket enclosing a rotationally-symmetrical holding chamber with a first chamber section and a radially-projecting opening edge. The first chamber section extends axially from the opening edge to a circumferential, inclined support surface having a passage window. A metering insert encloses a metering chamber and is arranged within the holding part and has a metering window. A rotatable closure part can be turned from a first position into a second position and vice versa and will effect a turn of the metering insert relative to the holding part and a turn of the passage window relative to the metering window.

20 Claims, 6 Drawing Sheets

(51) Int. Cl.
*B65D 41/26* (2006.01)
*B65D 47/26* (2006.01)
*B65D 51/28* (2006.01)

(58) Field of Classification Search
CPC .......... G01F 11/10; G01F 11/12; G01F 11/20; G01F 11/22; G01F 11/24; G01F 11/44; G01F 11/262; G01F 11/263
USPC ................................ 222/405, 425, 450–452
See application file for complete search history.

(56) References Cited

U.S. PATENT DOCUMENTS

| | | | |
|---|---|---|---|
| 1,914,766 A * | 6/1933 | Zaloschan | G01F 11/263 215/313 |
| 1,940,751 A * | 12/1933 | Hermani | G01F 11/24 222/248 |
| 2,584,781 A * | 2/1952 | Beatty | G01F 11/24 222/181.2 |
| 3,005,578 A * | 10/1961 | Mainicri | G01F 11/22 222/450 |
| 3,245,564 A | 4/1966 | Hirsch | |
| 3,390,941 A | 7/1968 | Weber | |
| 3,424,355 A * | 1/1969 | Blumen | G01F 11/22 222/450 |
| 5,020,699 A * | 6/1991 | Sams | G01F 11/263 222/109 |
| 5,947,331 A | 9/1999 | Goncalves | |
| 2006/0249476 A1 | 11/2006 | Albers et al. | |

OTHER PUBLICATIONS

Written Opinion (PCT/ISA/237) dated Jun. 13, 2016, by the European Patent Office as the International Searching Authority for International Application No. PCT/EP2016/054748.

* cited by examiner

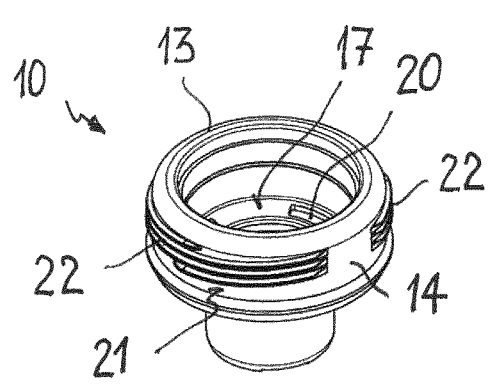
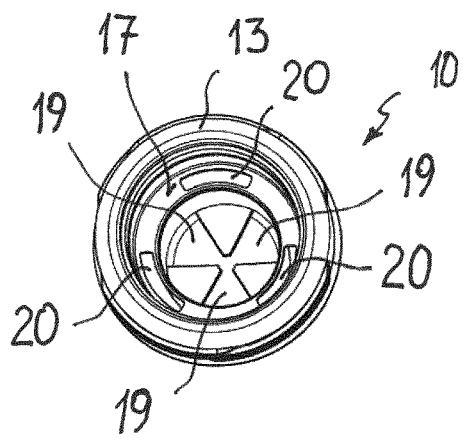
Fig. 3  Fig. 4
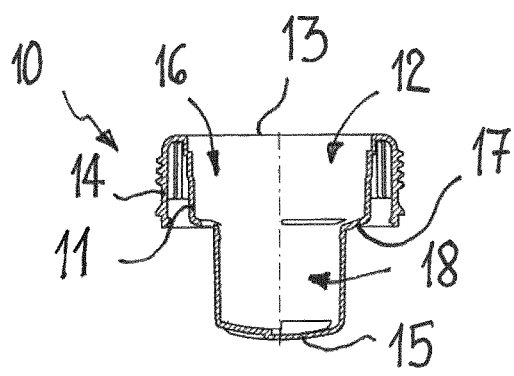
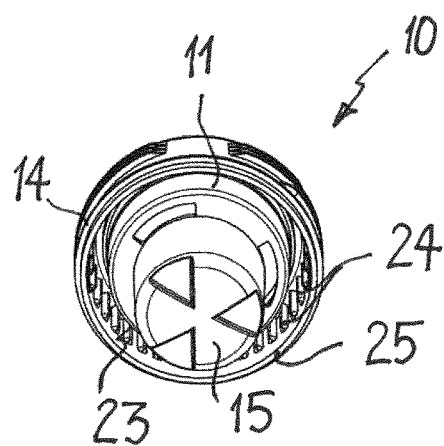
Fig. 5  Fig. 6
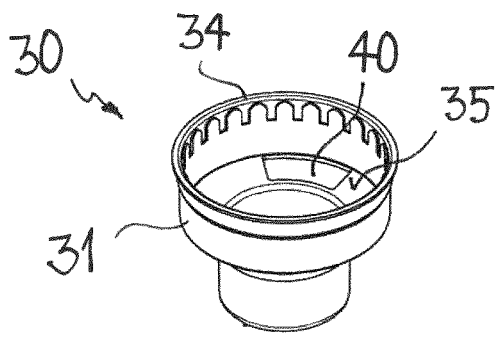
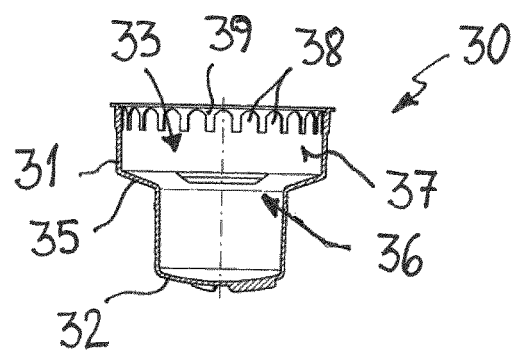
Fig. 7  Fig. 8

US 10,351,317 B2

METERING AND POURING DEVICE FOR FLOWABLE SUBSTANCES AND CONTAINER EQUIPPED WITH SUCH A METERING AND POURING DEVICE

RELATED APPLICATIONS

This application claims priority as a continuation application under 35 U.S.C. § 120 to PCT/EP2016/054748, which was filed as an International application on Mar. 7, 2016 designating the U.S., and which claims priority to Swiss Application No. 336/15 filed in Switzerland on Mar. 11, 2015. The entire contents of these applications are hereby incorporated by reference in their entireties.

FIELD

A metering and pouring device is disclosed for flowable substances. A container, such as a plastic container, also is provided with such a metering and pouring device.

BACKGROUND

In the home, in trade, and in industry, but also in medical and pharmaceutical applications, it is in many cases necessary to produce in metered form flowable substances that are placed in a container, for example in a bottle or in a vial. As described herein, the term "flowable substances" includes liquids whose viscosity is low enough to ensure an unhindered continuous flow, just like free-flowing solids, for example powder and granulates. From the state of the art, for example, metering devices for liquids and creams are known, which devices can come with a metering pump of defined stroke volume. Other known metering systems have a squeezable plastic container whose interior connects via a channel or a line to a superposed metering chamber. By squeezing the plastic container, the metering chamber is filled with liquid. From the latter, the liquid, more or less precisely metered, can then be poured.

These known metering devices or metering systems can be oriented very specifically to the substance that is to be produced, and in most cases they can be used only in connection with liquids and creams. Metering bottles with squeezable container walls and superposed metering chambers are configured as special metering systems. These are relatively expensive in production and have low metering accuracy.

SUMMARY

A metering and pouring device for flowable substances, comprising: a holding part that encloses a metering chamber and that has at least one passage window; a metering insert that can be turned relative to the holding part, which insert is arranged within the holding part and has at least one metering window; and a rotatable closure part which is equipped with first engagement means, which in an assembled state of components of the holding part, metering insert and closure part, are engaged with corresponding second engagement means in the metering insert in such a way that a turn of the closure part from a first position into a second position and vice versa will effect a turn of the metering insert relative to the holding part, whereby in the first position, the at least one metering window of the metering insert and the at least one passage window of the holding part at least partially overlap one another, and in the second position, the metering window and the passage window will be separated from one another, whereby when the closure part is turned beyond the second position, the first engagement means and the second engagement means are disengaged.

BRIEF DESCRIPTION OF THE DRAWINGS

Further advantages and features follow from the subsequent description of an exemplary variant embodiments disclosed herein with reference to the diagrammatic drawings. In a representation that is not to scale:

FIGS. 3 and 4 show two perspective views of a holding part of an exemplary metering and pouring device as disclosed herein;

FIG. 5 shows an axial cutaway view of the exemplary holding part;

FIG. 6 shows a perspective view of the exemplary holding part from below;

FIG. 7 shows a perspective view of an exemplary metering insert;

FIG. 8 shows an axial cutaway view of an exemplary metering insert;

DETAILED DESCRIPTION

Figure 1:
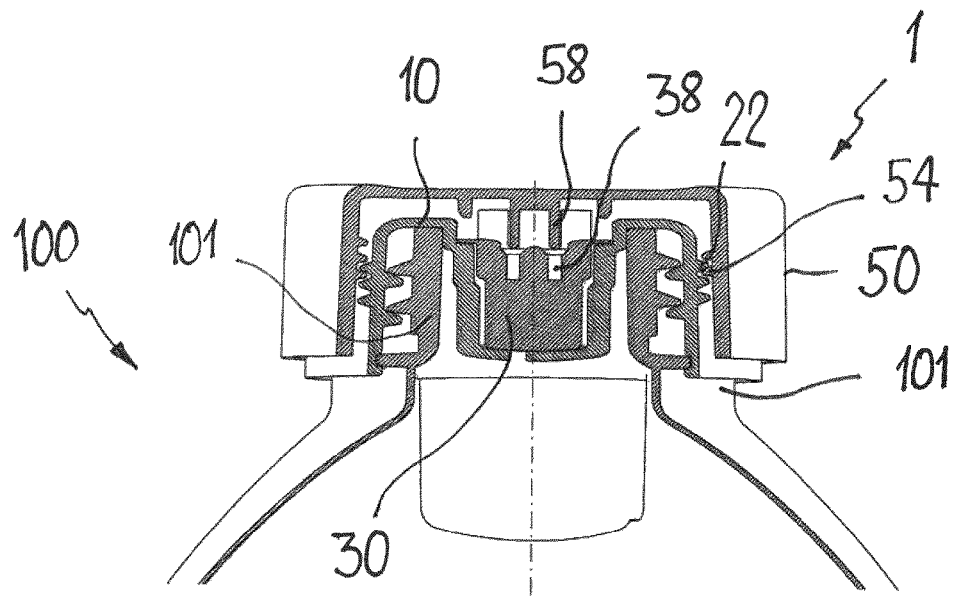
FIGS. 1 and 2 show two sectional representations of an container that is equipped with a metering and pouring device according to an exemplary embodiment disclosed herein.

A metering and pouring device is disclosed that is suitable for use in connection with liquids or with free-flowing substances. The metering and pouring device can provide a good metering accuracy. In this case, it can have a relatively simple design and make possible a simple assembly. The metering and pouring device can be usable in connection with containers with solid container walls, for example with glass bottles, or in connection with containers with container walls that have a certain flexibility, for example with plastic bottles.

In an exemplary general embodiment, a metering and pouring device for flowable substances has a holding part that encloses a metering chamber and has at least one passage window. Arranged within the holding part is a metering insert, which can be turned relative to the holding part and which is equipped with at least one metering window. In addition, the metering and pouring device has a rotatable closure part, which is equipped with first engagement means (e.g., a mechanical engagement), which are engaged with corresponding second engagement means in the metering insert when the components are assembled in such a way that a turn of the closure part from a first position into a second position and vice versa results in a turn of the metering insert relative to the holding part. In the first position, the at least one metering window of the metering insert and the at least one passage window of the holding part at least partially overlap one another. In the second position, the at least one metering window and the at least one passage window are separated from one another. When the closure part is turned beyond the second position, the first and second engagement means are disengaged.

The metering and pouring device according to an exemplary embodiment has a very simple design and an equally simple operability. The metering and pouring device that includes (e.g., consists of only) three parts does not need complex pump structures and does not require any containers with flexible or squeezable container walls. The opening and closing of the at least one metering opening is coupled to the rotatable closure part. If the closure part, for example, is removed, the at least one metering opening is presented in the closed state and the metering chamber can be emptied. When closing the metering chamber with the closure part, the at least one metering opening is again overlapped at least partially with the at least one passage opening in the holding part. As a result, the metering chamber can be filled again in the closed state. The filling and emptying of the metering chamber is done in an order that the user can understand. Emptying of the metering chamber when the metering opening is open can be prevented in a reliable manner.

The metering and pouring device is suitable for containers with rigid walls, for example glass bottles, just as for plastic bottles, whose walls are flexible, in particular compressible. Filling of the metering chamber can, for example, be done only by using gravitational force, by a container in the closed state, provided with a metering and pouring device, being turned upside down. As a result, the flowable substance, for example a liquid or a free-flowing powder or granulate, can pass into the metering chamber. This can be supported by ensuring that the container can be held vertically only on the closure part.

A variant embodiment can provide that a turn of the closure part produces a movement thereof in the axial direction. This can be achieved, for example, by means of a multi-start thread. Because of the axial movement of the closure part, namely when the closure part is turned beyond the second position, the first and second engagement means can be disengaged.

In a variant embodiment of the metering and pouring device, the holding part has an inside jacket that encloses a rotationally-symmetrical holding chamber with a first chamber section and has an approximately radially-projecting flange-like opening edge on one of its axial ends. The first chamber section extends axially from the flange-like opening edge to a circumferential, for example, inclined support surface, in which the at least one passage window is made. The metering insert is designed and configured in a manner corresponding to the holding part and has a jacket that is closed with an insert base. The jacket encloses an overflow chamber, which extends from an opening edge up to a circumferential, inclined connecting surface, in which the at least one metering window is made, and the metering chamber, which extends axially from the connecting surface up to an insert base and has a smaller inside diameter than the overflow chamber.

The provision of an overflow chamber directly connected to the metering chamber can improve the metering accuracy. While initially both chambers are filled with the flowable substance, for example by a container with a mounted closed metering and pouring device being turned upside down, when the container is put down on its base, the overflow chamber can be emptied again by the metering window and passage window that at least partially overlap one another. The exemplary inclined connecting surface supports the emptying of the overflow chamber by the at least one metering window and passage window back into the container. Only the amount of substance that has collected in the metering chamber remains in the metering insert. Because of the overflow chamber, it can be ensured that the metering chamber is also actually completely filled. With rotating removal of the closure part, the at least one metering window is closed, and the first and second engagement means are disengaged. The first and second engagement means are in general disengaged before the positive connection of the closure part to its counterpart is removed. Then, the now opened metering chamber can be emptied.

In another exemplary variant embodiment, the first engagement means on the closure part are at least one axially-running strip, which is arranged on a peripheral surface of an engagement skirt, which extends from an inner top surface of the closure part, and projects radially over the latter. The second engagement means are for example, a sequence of axial fins and grooves that correspond to the first engagement means and that are provided next to the opening edge on a wall of the overflow chamber. The wall can be an inside wall or an outside wall of the overflow chamber. Accordingly, the at least one axial strip can be arranged on an inside surface or on an outside surface of the engagement skirt that projects from the inner top surface of the closure part. The first and second engagement means are for example, distributed uniformly over the periphery. As a result, reliable relative turning of the metering part with respect to the holding part can be ensured.

So that, during the engagement of the first and second engagement means in one another, no canting can occur and so that the engagement means do not accidentally line up front side to front side, each groove on the inside wall of the overflow chamber that is bordered by two successive axial fins has an intake area that is expanded in the direction of the opening edge for the at least one corresponding strip on the engagement skirt. The intake areas ensure error-free operation of the engagement means that engage in one another during rotating application of the closure part.

Another exemplary variant embodiment can provide that at least one axial fin on the engagement skirt has a partial area that is tapered to the free end of the at least one fin. As a result, the danger of the front sides of the engagement means lining up on one another can be still further reduced.

On the closure part, a sealing element can be provided that reliably seals the interior of the metering chamber. To this end, an annular sealing support projects in the axial direction from the inner top surface of the closure part, which support concentrically surrounds the engagement skirt and is located radially adjacent to the flange-like opening edge when the components are assembled. Because of the circumferential sealing support, even when the inner top surface of the closure part does not rest on the front side on the flange-like opening edge, and the container may still not be completely closed, a seal is ensured that prevents the flowable substance stored in the container from passing into the environment. The sealing action of the closure part thus does not depend on the torque with which the closure part is locked.

When the components are assembled, the metering insert is held axially captive in the holding part by positive fit. The positive fit can be realized by, for example, an annular bead on the outside wall of the jacket of the metering insert and a circumferential groove in the inside surface of the inside jacket of the holding part or vice versa. In addition to the axial securing of the metering insert in the holding part, increased friction between the two components is also achieved by the positive fit. This increased friction is desired in order to prevent the metering insert and the holding part from already turning relative to one another by small vibrations. The increased friction therefore can require an amount of energy that in general can be applied on the deliberately rotated closure part and on the metering attachment by the interlocking of the engagement means.

A variant exemplary embodiment can provide that three passage windows are arranged in the support surface of the inside jacket of the holding part, which windows in each case are at the same angular distance from one another and in each case extend in the peripheral direction over an angular range of less than 60°. In an analogous way thereto, three metering windows can be arranged in the connecting surface of the jacket of the metering insert, which windows in each case are at the same angular distance from one another and in each case extend in the peripheral direction over an angular range of less than 60°. The provision of multiple metering windows and passage windows, which can be at least partially overlapped with one another, facilitates the mounting of the metering insert in the holding part in precisely the correct location and makes possible a faster filling of the metering insert with the flowable substance.

The mounting of the metering insert in the holding part in precisely the correct location can be ensured by, for example, optical monitoring systems. As an alternative, a mechanical positioning system can also be provided, in which system, for example, three fingers are guided from below through the through window and then the metering insert is inserted in such a way that the fingers extend through the metering window. As a result, it is ensured that the two components are positioned in precisely the correct location and the metering window and the through window overlap with one another. The axial attachment of the two components is then carried out simply by pressing together the two parts, whereby a positive fit is created between the two components. Finally, positioning aids can also be provided on the metering insert and on the holding part. The latter can be, for example, axial strips and grooves that cooperate with one another.

To ensure easier operability of the metering and pouring devices that are assembled together, it may be advantageous when in another variant embodiment, the rotationally-symmetrical holding chamber is closed with a chamber base on its end opposite to the flange-like opening edge. A second chamber section, which extends to the chamber base, connects to the support surface. On its side that faces the interior of the holding chamber, the chamber base has a number of circle-segment-like recesses that corresponds to the number of passage windows. In this case, each recess suitably extends over an angular range that corresponds to the peripheral extension of a passage window in the preferably inclined support surface. Corresponding to this, a number of radial strips, which corresponds to the number of metering windows in the connecting surface, are made on an outside surface of the insert base of the metering insert that faces the chamber base. When the components are assembled, each strip is accommodated by a recess in the chamber base. The cooperating strips and recesses prevent an overtightening of the components that turn relative to one another, the metering insert and the holding part.

In another exemplary variant embodiment of the metering and pouring device, a locking projection, for example, a radial locking fin, can project from the base of the recess into an end area of its peripheral extension of each recess. The locking projections ensure that the metering insert and the holding part are secured in their final positions, which correspond to the first and second positions of the closure part and prevent an unintentional turning relative to one another, for example by vibrations. This can be desirable in particular for the closed final position of the two components, in which the metering window(s) is/are closed and the closure part is unscrewed. The height of the locking projections can be sized in such a way that with relative turning of the metering insert in comparison to the holding part, noticeable resistance must be overcome. In contrast, the locking projections, however, are flat enough so that no blocking of the two components that can turn relative to one another can occur.

According to another exemplary embodiment, wipers can be arranged on the bottom of the connecting surface of the metering insert, which faces the support surface of the holding part, in the area of the metering window. The wipers can be advantageous, in particular in connection with free-flowing substances, by removing particles that have penetrated between the connecting surface and the support surface. The wipers can, for example, include (e.g., consist of) a softer material than the metering insert and the holding part. The wiping unit can be made integral with the metering part or else with the holding part. For example, the metering part or the holding part can be produced with wipers in a two-component injection-molding method.

Another exemplary variant embodiment of the metering and pouring device can provide that the flange-like opening edge of the holding part is connected with a cylindrical outer skirt, which extends in a manner that is axis-parallel and concentric to the inside jacket and on its outside wall has means for positive securing of the closure parts that are equipped with corresponding engagement means. This variant embodiment allows a preassembly of the holding part, the metering insert, and the closure part. All three components can be present already assembled, whereby the at least one metering opening of the metering part and the at least one passage opening of the holding part overlap with one another at least partially; the at least one metering opening is thus open. With rotating removal of the closure part from the holding part in a first rotating direction, the metering insert is turned relative to the holding part by the interlocking first and second engagement means, the at least one axially-running strip on the peripheral surface of the engagement skirt of the closure part, and the sequence of axial fins and grooves in the vicinity of the opening edge of the metering insert, until at least one metering opening is closed. If the closure part is superposed again on the holding part, which the metering insert occupies, and rotated in the opposite direction, the first and second engagement means are first axially brought together until they are engaged with one another in the second position. While continuing to rotate, the metering window and the passage window are overlapped again. At the same time, the closure part is fastened to the holding part.

In the case of the above-described exemplary variant embodiments, the closure part of the metering and pouring device can be fastened directly to the neck of a container previously provided with a holding part and metering insert. In the most recently-described variant embodiment, the metering and pouring device is mounted on the neck of a container as an entire closure part, i.e., with an already superposed closure part. The assembly is done, for example, by mounting on top of one another three components— namely holding part, metering insert and closure part, which are assembled together to form a whole. The preassembly of the metering and pouring device to form a whole that includes (e.g., consists of) holding part, metering insert and closure part can have logistical advantages and advantages in terms of handling for the user, in particular a dispenser. A factory-made preassembled assembly now just has to be combined with the corresponding container and be mounted on the neck of the container.

The means for positive securing of the closure part and the corresponding engagement means on the holding part can be, for example, cooperating projections and sliding tracks of a bayonet closure. In an alternative exemplary variant embodiment, the means that cooperate in a positive manner can be designed as the first threaded section arranged on the closure part and the second threaded section arranged on the outer skirt. They can be designed and configured as, for example, a three-part coarse thread, which makes possible an attachment and engagement of the closure part in three positions that are offset in each case by 120°. The slope of the threaded sections is designed in such a way that at the beginning of the rotational movement of the closure part, it results in an axial approximation of the first and second engagement means until the latter interlock in the second position and with further turning up to the first position result in a relative turning of the metering insert in comparison to the holding part in order to further open the at least one metering opening. An increase of the first and second threaded sections can be configured in such a way that in the first position, the inner top surface of the closure part rests on the flange-like opening edge of the holding part.

The holding part of the metering and pouring device is mounted in a stationary and axially captive manner when mounted on the neck of a container. This can be done by, for example, pressing thereinto. As an alternative or else as a supplement to this, the holding part can also be secured, for example, by gluing on the container neck. In the case of the previously-described variant exemplary embodiment of the metering and pouring device, in which the holding part, the metering insert and the closure part are put together to form a preassembled whole, anti-rotation devices and at least one axial securing means for mounting the metering and pouring device on a container neck that is equipped with corresponding engagement means can be provided for radial and axial securing of the holding part on an inside wall of the outer skirt that faces the inside jacket of the holding part. The anti-rotation devices and the axial securing means attach the metering and pouring device by positive fit onto the container neck. It is understood, however, that in addition, a frictional attachment (e.g., force fit) or integral attachment (e.g., gluing) can also be provided.

Individual or all components of the metering and pouring device, namely, the holding part, the metering insert, and the closure part, can be produced by a plastic injection method, for example by an injection-molding method. In this connection, any of the components can be designed in one piece.

A container, equipped with a metering and pouring device that is designed and configured for holding flowable substances with a metering and pouring device, has a container neck, on which the holding part of the metering and pouring device is mounted in a stationary and axially captive manner. The securing of the holding part on the container neck can be ensured by positive fit and/or by gluing and/or by force fit. For example, the container neck is designed at least on one part of its periphery with a sequence of axially-extending teeth and grooves. The latter can cooperate, for example, in a positive manner with corresponding gears, which are configured on an inside wall of an axial skirt of the holding part, which encloses the container neck.

The metering and pouring device can be mounted on a container neck in such a way that when the closure part is superposed, the at least one metering window of the metering insert is at least partially overlapped with the passage window in the holding part. The closed container is thus always ready for metering. If the container, for example, is turned upside down, the metering chamber including the overflow chamber is filled constantly. If it is on its base, the metering chamber is initially empty. To fill the metering chamber, the container must be rotated by 180° only once. When turned back, excess substance flows through the at least one open metering window back into the interior of the container. The metering chamber, however, remains filled. When the closure part is removed, the metering window is closed, and it is ensured that no substance can flow out from the interior of the container. To support the filling of the metering chamber, the container can be configured as a so-called upside-down container, which can only be stored vertically on the closure part.

A metering and pouring device as described herein is suitable for mounting on a container with rigid walls, for example a glass bottle, just as for mounting on a container with flexible walls, for example a plastic container. In this case, the plastic container can be advantageously produced by a blow-molding method—for example an extrusion-blow-molding method, a stretch-blow-molding method, or an injection-blow-molding method—from a plastic that is suitable for the above-mentioned methods.

Figure 2:
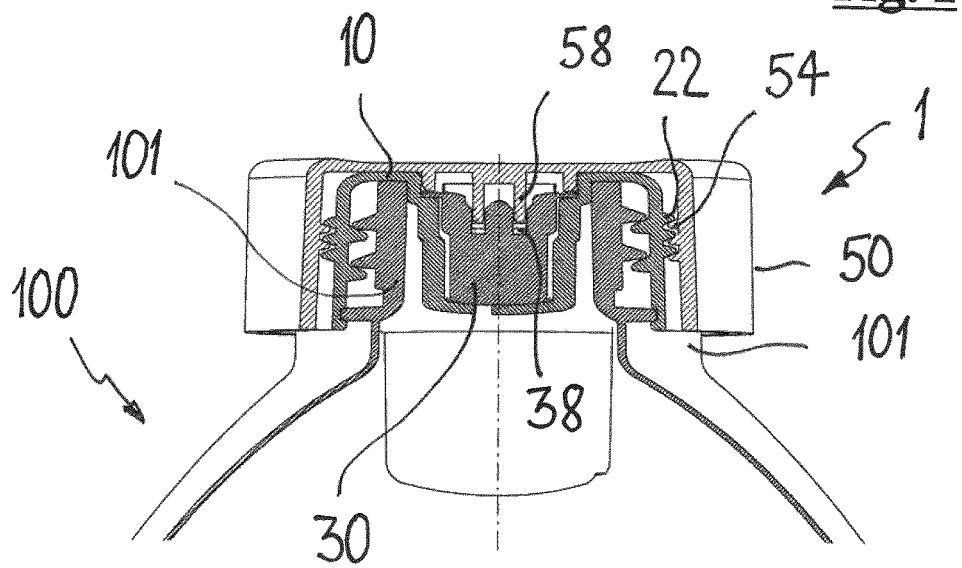
Figure 9:
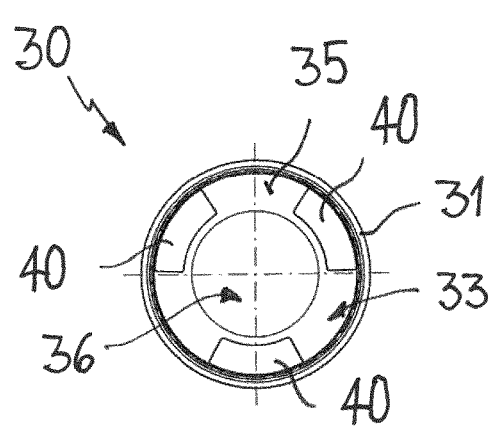
FIG. 9 shows a top view of an exemplary metering insert.
Figure 10:
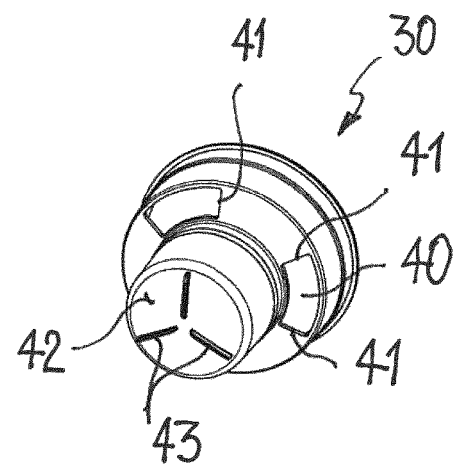
FIG. 10 shows a perspective view of an exemplary metering insert from below.

FIGS. 1 and 2 show two axial cutaway views of an exemplary metering and pouring device 1, which is mounted on a neck 101 of a container 100, for example a plastic bottle. The metering and pouring device 1 includes three components, namely a holding part 10, a metering insert 30 that is captive and is mounted to rotate relative to the holding part, and a closure part 50, which according to the depicted embodiment is connected by positive fit to the holding part 10. FIG. 1 and FIG. 2 show the closure part 50 in two positions, one (FIG. 1) shortly after it has been mounted on top of the holding part 10 and has been turned until the closure part 10 is advanced into a second position in positive engagement with corresponding means on the holding part 10, and one (FIG. 2) in a first position, in which the closure part 10 is completely untwisted. Below, the function of the closure part 50 for actuating the metering and pouring device 1 is discussed in even more detail.

FIGS. 3, 4 and 6 show three perspective views of the holding part 10. FIG. 5 shows an axial cutaway view of the holding part 10. The holding part 10 has an inside jacket 11, which encloses a rotationally-symmetrical holding chamber 12. On one of its axial ends, a flange-like opening edge 13 projects from the inside jacket 11, for example radially, to which edge an outer skirt 14 that runs essentially parallel to the inside jacket 11 connects. Two threaded sections 22 are designed on an outside surface 21 of the outer skirt 14. On its axial end opposite to the opening edge 13, the inside jacket 11 is closed with a chamber base 15.

The holding chamber 12 has a first chamber section 16, which extends from the flange-like opening edge 13 axially to a circumferential support surface 17 inclined in the depicted embodiment. A second chamber section 18 extends from the support surface 17 to the chamber base 15. In the circumferential, inclined support surface 17, three passage windows 20 are recessed, which extend in the peripheral direction, for example over an angle of 60° or less. According to the depicted embodiment, three passage windows 20 are made in the support surface 17. It is understood that the number of passage windows can also be smaller. For example, even only one passage window can be provided. An alternative variant embodiment can also have a larger number of passage windows, which then extend correspondingly over a smaller angular range of the support surface. Even a large number of smaller passage windows or openings can be provided in the support surface similar to a coarse sieve.

The second chamber section 18 has a smaller inside diameter than the first chamber section 16. In the chamber base 15, three circle-segment-like recesses 19 are formed according to the depicted embodiment. The latter are arranged in each case between two passage windows 20 (FIG. 4) and extend in the peripheral direction over an angular range that corresponds to that of the peripheral extension of the passage window 20. The function of these recesses 19 is discussed in still greater detail below.

From the perspective view from below of the holding part 10, it is evident that an inside wall 23 of the outer skirt 14 is provided with axially-running arms 24, which are distributed uniformly over the entire periphery of the inside wall 23 according to the depicted embodiment. The axial arms 24 are used in the mounting of the metering and pouring device 1 on the neck of a container as an anti-rotation device. A means for axial securing of the holding part on a container neck is also configured and arranged near its free end on the inside wall 23 of the outer skirt. According to the depicted embodiment, this is a circumferential bead 25 that emerges from the inside wall 23 of the outer skirt 14.

In FIGS. 7 to 10, a metering insert 30 is depicted in different views. The metering insert 30 has a shape that is designed corresponding to the holding part 10 and has a jacket 31 that is closed with an insert base 32. The jacket 31 encloses an overflow chamber 33, which extends from an opening edge 34 up to a circumferential inclined connecting surface 35, and a metering chamber 36, which extends from the connecting surface 35 axially up to the insert base 32. The metering chamber 36 has a smaller inside diameter than the overflow chamber 33. In the inclined connecting surface 35, three metering windows 40 are arranged according to the depicted embodiment, which windows extend in the peripheral direction, for example, over an angle of 60° or less. On the outside of the jacket 31, each metering window 40 can also have wipers 41 that extend, for example, parallel to the approximately radially-running edges of the metering window 40.

According to the depicted embodiment, three metering windows 40 are made in the connecting surface 35. It is understood that the number of metering windows can also be smaller. For example, even only one metering window can be provided. An alternative variant embodiment can also have a larger number of metering windows, which then extend in a corresponding manner over a smaller angular range of the inclined connecting surface. Even a large number of smaller metering windows or metering openings can be provided in the connecting surface similar to a coarse sieve, the distribution and arrangement of which windows or openings correspond to, for example, that in a correspondingly designed holding part. Below the opening edge 34 of the jacket 31 of the metering insert 30, two engagement means 38 in the form of a uniform sequence of axially-running fins and grooves are made in an inside wall 37 of the jacket 31. The second engagement means 38 are arranged along the entire periphery of the inside wall 37 of the jacket 31. The second engagement means 38 are made near the opening edge 34 in each case with an expanded intake area 39.

The perspective view from below of the metering insert 30 shows radial strips 43 made on an outside surface 42 of the insert base 32. In the depicted embodiment, the number of radial strips 43 corresponds to that of the metering window 40. In this case, the radial strips 43 are arranged in each case in such a way that they are placed in an axial projection connecting to a radial edge area of a metering window 40. The three radial strips 43 project in a metering insert 30, mounted in the holding part 10, in each case in a circle-segment-like recess 19 in the chamber base 15, and are used as an overtightening safety device in the case of a relative turning of the metering insert 30 relative to the holding part 10.

Figure 11:
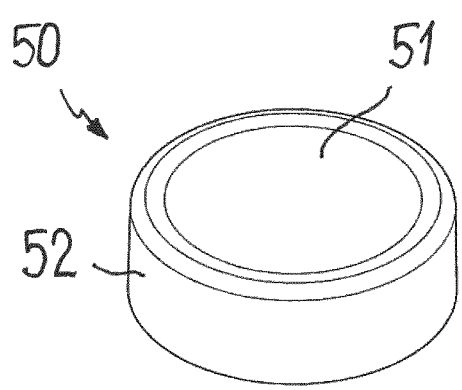
FIG. 11 shows a perspective view of an exemplary closure part.
Figure 12:
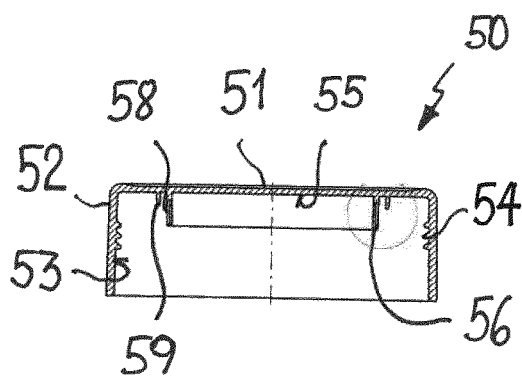
FIG. 12 shows an axial cutaway view of the exemplary closure part.
Figure 13:
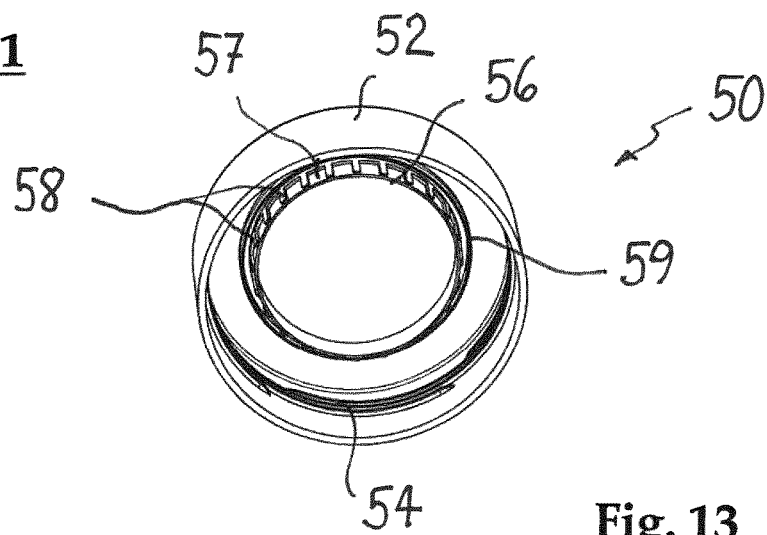
FIG. 13 shows a perspective view of the exemplary closure part from below.
Figures 14, 15:
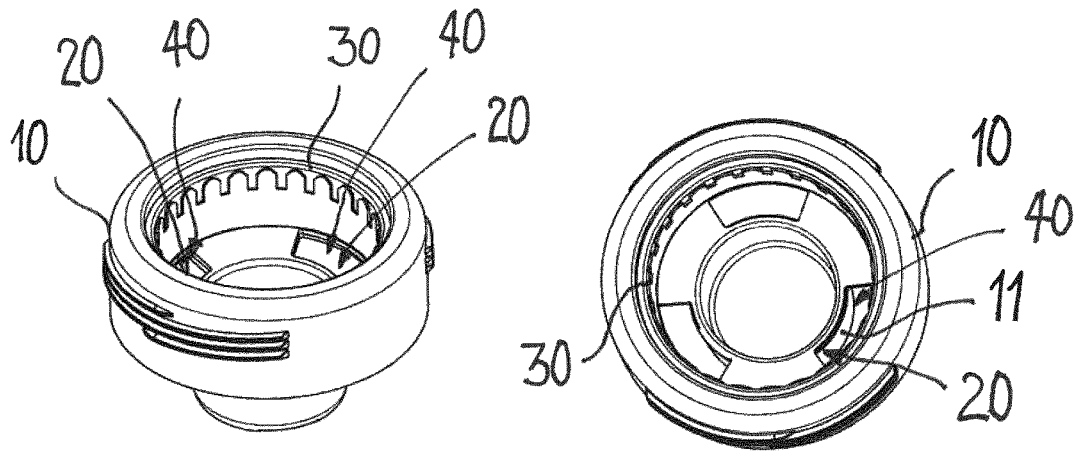
FIGS. 14 and 15 show two perspective views of an exemplary holding part with a metering insert mounted therein in the open state.

FIGS. 11 to 13 show various views of a closure part 50. The closure part 50 has a cover plate 51 that is delimited by an essentially cylindrical extension 52. Positive means, for example first threaded sections 54, are made on an inside surface 53 of the cylindrical extension 52, which sections are used for rotating positive attachment of the closure part 50 on the holding part 10. In this case, the first threaded sections 54 of the closure part 50 are positively engaged with the corresponding second threaded sections 22 on the outside surface 21 of the outer skirt 14 of the holding part 10.

FIGS. 12 and 13 show that a cylindrical engagement skirt 56 projects from an inner top surface 55 of the cover plate 51 of the closure part 50. First engagement means 58 are made on a peripheral surface 57 of the engagement skirt 56 in the form of axially-extending strips that are for example arranged equidistant from one another and that radially project over the peripheral surface 57. In addition, it is also clear from the figures that an annular sealing support 59 projects axially from the inner top surface 55 and concentrically surrounds the engagement skirt 56. In the case of the closure part 50 that is mounted on the holding part 10, the sealing support 59 is located radially adjacent to the flange-like opening edge 13 of the holding part 10.

Figure 16:
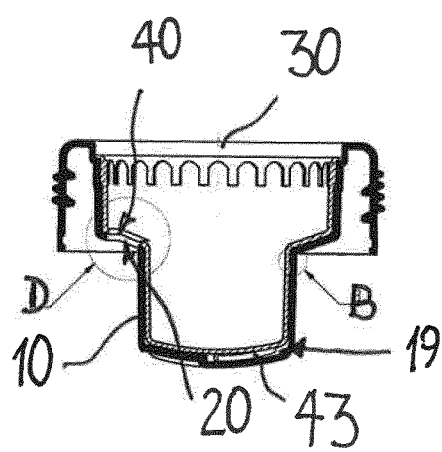
FIG. 16 shows an axial cutaway view of the two assembled components according to FIGS. 14 and 15.
Figure 17:
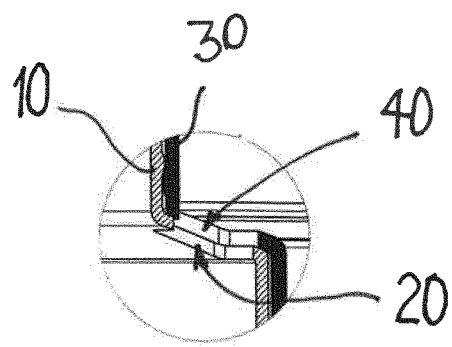
FIG. 17 shows a detail representation according to circle D in FIG. 16.

FIGS. 14 to 19 show various views of a metering insert 30, mounted in a holding part 10, in the open state of the metering window 40 and passage window 20. In this case, the metering window 40 and the passage window 20 overlap. This can be clearly seen in particular in FIG. 15, in which a part of the inside jacket surrounding the smaller-diameter second chamber section is visible through the overlapping metering and passage windows 40, 20. Also, the sectional representation in FIG. 16 and the detail representation in FIG. 17 according to item D in FIG. 16 show that in the open state, the metering window 40 in the metering insert 30 and the passage window 20 in the holding part 10 overlap. As can be seen from the diagrammatic representation in FIG. 18, the radial strips 43 that project from the insert base extend to the metering insert in the circle-segment-like recesses in the chamber base 15 of the holding part 19. In the open state, the radial strips 43 are located in each case on one end of the corresponding recess 19, connected to the sections of the chamber base 15 that separate the circle-segment-like recesses 19.

Figure 19:
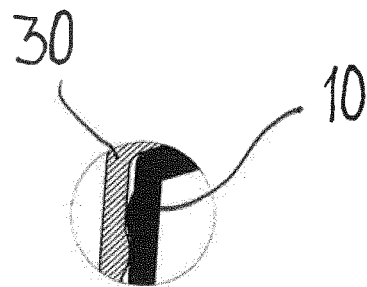
FIG. 19 shows a detail representation according to circle B in FIG. 16.

FIG. 19 shows on an enlarged scale a detail referred to as B in FIG. 16. A variant embodiment of a positive axial securing of the metering insert 30 within the holding part 30 is clear from this. The positive connection is in this case sized in such a way that an intended turning of the metering insert 30 relative to the holding part is made possible when overcoming a low friction resistance, but an accidental turning of the two components 10, 30 toward one another is prevented.

Figure 20:
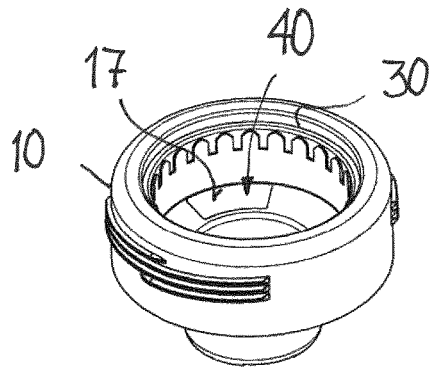
FIG. 20 shows a perspective view of an exemplary holding part with a metering insert mounted therein in the closed state.
Figure 21:
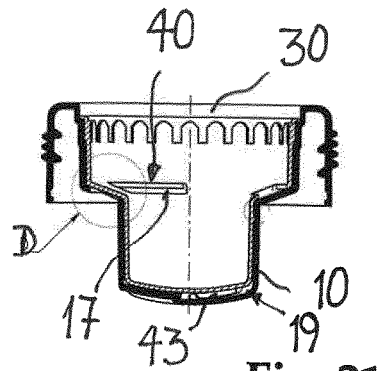
FIG. 21 shows an axial cutaway view of the two assembled components according to FIG. 20.
Figure 22:
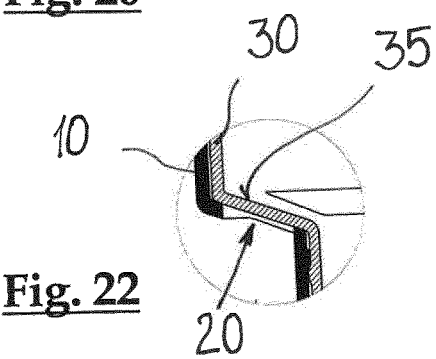
FIG. 22 shows a detail representation according to circle D in FIG. 21.

FIGS. 20 to 23 show various views of a metering insert 30, mounted in a holding part 10, in the closed state of the metering window 40 and the passage window. In this case, the metering windows 40 in each case overlap with a section of the support surface 17 of the holding part 10 between the passage windows 20 (FIG. 20) or each passage window 20 is covered by a section of the connecting surface 35 of the metering insert 30 between the metering windows 40 (FIG. 22).

Figure 18:
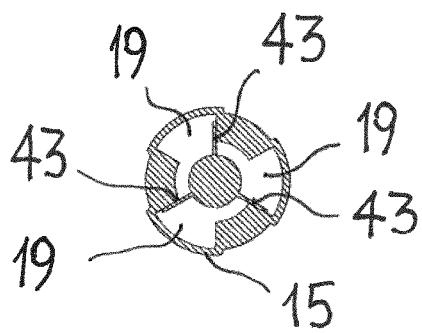
FIG. 18 shows a diagrammatic representation of an exemplary overtightening safety device in the base area of the holding part and the metering insert in the open state.
Figure 23:
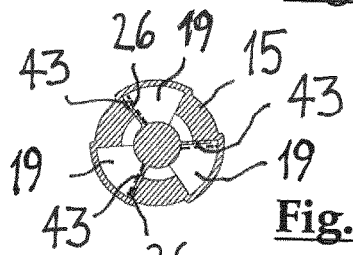
FIG. 23 shows a diagrammatic representation of an exemplary overtightening safety device in the base area of the holding part and the metering insert in the closed state.

The diagrammatic representation in FIG. 23, analogously to FIG. 18, shows that the radial strips 43 that project from the insert base 32 in turn extend into the circle-segment-like recesses in the chamber base 15 of the holding part 19. In the closed state of the passage window 20 and the metering window 40, the radial strips 43 in turn are located in each case on one end of the corresponding recess 19, connected to the sections of the chamber base 15 that separate the circle-segment-like recesses 19. A comparison with FIG. 18 shows, however, that the radial strips 43 on the opposite end of the circle-segment-like recesses 19 adjoin the separating sections of the chamber base 15. In FIG. 23, radial locking fins 26 are indicated by broken lines, which fins protrude above the base of each circle-segment-like recess 19. The locking fins 26 ensure that the metering insert 30 and the holding part 10 are secured in their final positions with closed passage windows 20 and metering windows 40 and prevent an unintentional turning relative to one another, for example because of vibrations. The height of the locking projections 26 can be sized in such a way that with relative turning of the metering insert 30 relative to the holding part 10, noticeable resistance must be overcome. In contrast, the locking projections 26, however, are flat enough so that no blocking of the two components 10, 30 that can turn relative to one another can occur.

Figure 24:
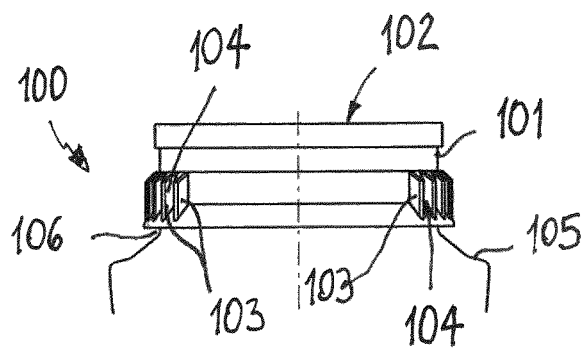
FIG. 24 shows an exemplary embodiment of a container neck that is designed and configured for holding a metering and pouring device according to an exemplary embodiment disclosed herein.

FIG. 24 shows an embodiment of a neck 101 of a container 100 for the assembly of a metering and pouring device 1 of the above-described type, designed according to the invention. In particular, approximately radially-projecting teeth 103 are made next to a neck opening 102, which teeth are separated from one another by axially-running grooves 104. In an exemplary embodiment, the sequence of teeth 103 and grooves 104 must not extend over the entire periphery of the neck 101. According to the depicted embodiment, two segments, opposite to one another, with a sequence of teeth 103 and grooves 104 are provided on the neck 101 of the container 100, which segments can extend, for example, in each case over a peripheral area of approximately 30° to 60°. The sequence of teeth 103 and grooves 104 is used as an anti-rotation device for the holding part of the mounted metering and pouring device. In the direction of a shoulder 105 of the container 100, seen below the sequence of teeth 103 and grooves 104, the container neck is provided with a circumferential undercut 106. The undercut 106 is used for axial securing of the holding part of the mounted metering and pouring device.

Figure 25:
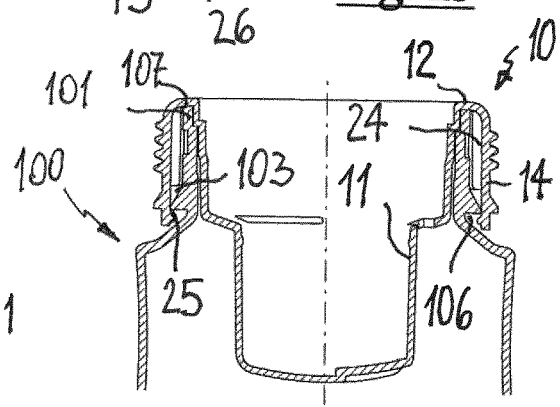
FIG. 25 shows an axial cutaway view of an exemplary holding part that is mounted on a container neck according to FIG. 24.

FIG. 25 shows the container 100 according to FIG. 24 with a mounted holding part 10 of a metering and pouring device. For the sake of greater clarity, the representation of the usual components (metering insert and cover part) of the metering and pouring device was eliminated. It is clear from FIG. 25 that the outer skirt 14 of the holding part 10 encloses the neck 101 of the container 100. The inside jacket 11 of the holding part that encloses the holding chamber 12 extends through the neck opening 102 into the interior of the container 100. The opening edge 13 of the holding part 10 can rest on a neck edge 107 that delimits the neck opening 102. The axial arms 24 that project from the inside wall 23 of the outer skirt 14 engage in the grooves 104 between the teeth 103 that project from the neck 101 and form an anti-rotation device for the holding part 10. The circumferential bead 25 that projects from the inside wall 23 in the area of the free end of the outer skirt 14 of the holding part 10 engages behind the undercut 106 on the neck 101 of the container 100 and forms an axial securing means for the mounted holding part 10.

Figure 26:
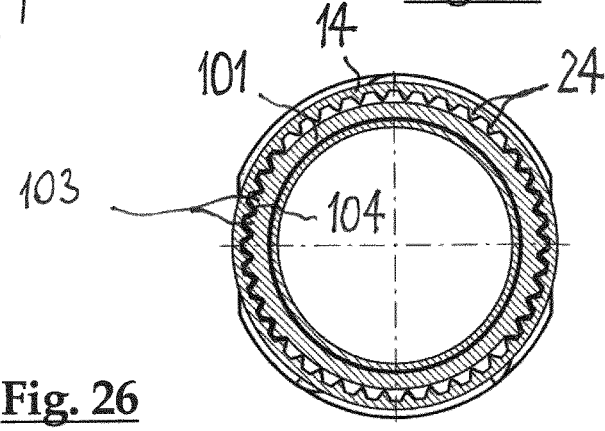
FIG. 26 shows a cross-sectional representation of an anti-rotation device of the holding part on a container neck according to FIG. 24.
Figure 27:
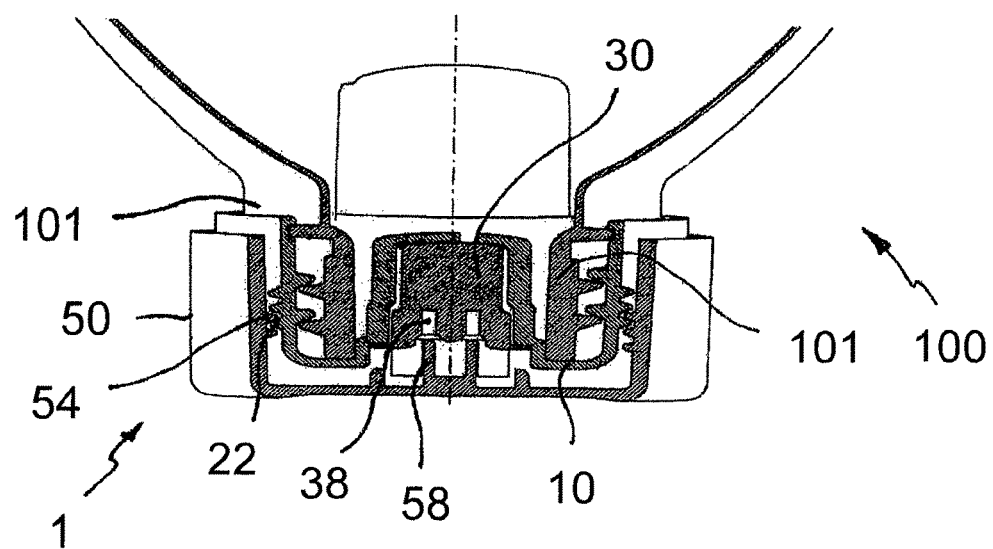
FIG. 27 shows a sectional representation of a container that is equipped with the metering and pouring device according to an exemplary embodiment of the disclosure and arranged as a base.

FIG. 26 shows a cross-section through the neck 101 of the container 100 and the holding part 10 mounted thereon in the area of the teeth 103 that project from the neck 101. On the right and left in the representation, the axial arms 24 engage on the outer skirt 14 in the grooves 104 between the teeth 103 that project radially from the neck 101 of the container 100 and prevent a turn of the holding part 10.

To explain the transfer of the rotational movement of the closure part 50 to the metering insert 30, which can be turned relative to the holding part 10 that is mounted in a stationary manner on the neck 101 of the container 100, we refer back to FIG. 1 and FIG. 2. FIG. 1 shows the closure part 50 in a position immediately after it was superposed and its first threaded section 54 at the beginning of the rotation movement, has engaged with the second threaded sections 22 on the outside surface of the outer skirt of the holding part 10. The first engagement means 58 that project from the cover plate of the closure part 50 are still not engaged with the second engagement means 38 below the opening edge of the metering insert 30. The two cooperating first and second threaded sections 54, 22 are in each case configured as a coarse thread in such a way that in the case of a further rotational movement of the closure part 50, it results in an axial approximation of the first and second engagement means 58, 38, until the latter are engaged with one another. The expanded intake area on the second engagement means (reference number 39 in FIG. 8) in this case facilitates the interlocking of the first and second engagement means 58, 38. By further rotation of the closure part 50, the metering insert 30 is turned relative to the holding part 10 that is mounted in a stationary manner on the neck 101 of the container 100, and the metering openings of the metering part 30 are overlapped with the passage openings on the holding part 10 (FIG. 14 to FIG. 17). The locked closure part is in the position depicted in FIG. 2. In this first position, in the case of the closed metering and pouring device 1, the metering chamber of the metering insert 30 can be filled by pivoting the container 100 by 180° and pivoting it back again into its initial position.

During rotating loosening of the closure part 50 from the holding part 10 by rotation in the opposite direction, first the rotational movement of the closure part 50 is transferred via the first engagement means 58 to the second engagement means 38 in the metering insert 30, and the metering openings 40 and the passage openings 20 are closed in the second position (FIG. 20 to FIG. 22). During further rotation of the closure part 50, the first and second engagement means 58, 38 again are disengaged, as is depicted in FIG. 1. Because of another slight rotational movement, the closure part 50 can be finally removed, and the measured amount of the flowable substance found in the metering chamber can be poured out.

Exemplary embodiments have been explained below based on a variant embodiment of the metering and pouring device, in which the holding part, the metering insert, and the closure part can be preassembled to form a structural whole. The metering and pouring device can then be mounted as a structural whole on the neck of a container. An alternative variant embodiment can also provide, however, that only the holding part and the metering insert are preassembled as a structural unit, and the cover part is separately mounted only at a later time. In this variant embodiment, the holding part can be configured, for example, without an outer skirt with second threaded sections for rotating positive securing of the closure part. Instead, in a known fashion, the closure part is screwed onto the neck of the container that is equipped with the holding part and the metering insert mounted therein via threaded sections made on the neck of the container. The turning of the metering insert relative to the holding part can in this case be carried out analogously to the process that is described in the section above. The container can be a container with rigid walls, for example a glass container, or it can be a plastic container that includes (e.g., consists of) for example, plastics or plastic mixtures that can be processed in a blow-molding method. The description above of specific embodiment thus is used only to explain aspects of the invention and is not to be considered as limiting. Rather, the invention is defined by the claims and the equivalents that are clear to one skilled in the art and consist of general inventive ideas.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A metering and pouring device for flowable substances, comprising:
a holding part including an inside jacket that encloses a rotationally-symmetrical holding chamber with a first chamber section, and a radially-projecting opening edge on an axial end of the holding part, whereby the first chamber section extends axially from the opening edge to a circumferential inclined support surface in which at least one passage window is made;
a metering insert that encloses a metering chamber, the metering insert arranged inside the holding part and configured to be rotatable relative to the holding part, the metering insert relative to the holding part having at least one metering window,
wherein the metering insert is configured in a manner corresponding to the holding part and includes a jacket that is closed with an insert base, which jacket encloses an overflow chamber which extends from an opening edge up to a circumferential, inclined connecting surface in which the at least one metering window is made,
wherein the metering chamber, which extends axially from the connecting surface to the insert base, has a smaller inside diameter than the overflow chamber; and
a rotatable closure part equipped with first engagement means, which in an assembled state of components of the holding part, metering insert and closure part, are engaged with corresponding second engagement means in the metering insert in such a way that a turn of the closure part from a first position into a second position and vice versa will effect a turn of the metering insert relative to the holding part, whereby in the first position, the at least one metering window of the metering insert and the at least one passage window of the holding part at least partially overlap one another, and in the second position, the metering window and the passage window will be separated from one another, whereby when the closure part is turned beyond the second position, the first engagement means and the second engagement means are disengaged, wherein the closure part is configured such that a movement in an axial direction will be produced by a turn of the closure part.

2. Metering and pouring device according to claim 1, wherein the metering insert is held axially captive in the holding part by positive fit.

3. Metering and pouring device according to claim 1, comprising:
three passage windows arranged in the support surface of the inside jacket of the holding part, which windows in each case are at a same angular distance from one another and in each case extend in a peripheral direction over an angular range of less than 60°; and
wherein three metering windows are arranged in the connecting surface of the jacket of the metering insert, which windows in each case are at a same angular distance from one another and in each case extend in a peripheral direction over an angular range of less than 60°.

4. The metering and pouring device according to claim 1, in combination with a container, whereby the holding part is mounted in a stationary and axially captive manner on a neck of the container.

5. The combination according to claim 4, wherein the holding part, the metering insert and the closure part are configured of blow-molded plastic.

6. The combination according to claim 4, configured as an upside-down container, whereby a cover plate of the closure part forms a base of the container.

7. The combination according to claim 4, wherein the stationary and axially captive attachment of the holding part to the container neck is configured as a positive fit and/or a gluing and/or a force fit.

8. The combination according to claim 7, wherein the metering and pouring device is mounted on the container neck such that in the case of the closure part being superposed with the holding part, the at least one metering window is at least partially overlapped with the passage window, while the metering window is closed when the closure part is removed.

9. Metering and pouring device according to claim 1, wherein the first engagement means on the closure part comprises:
- at least one axially-extending strip, which is arranged on a peripheral surface of an engagement skirt which extends from an inner top surface of the closure part and projects radially; and
- wherein the second engagement means are an alternating sequence of axial fins and grooves, which are provided next to an opening edge on a wall of the overflow chamber.

10. Metering and pouring device according to claim 9, wherein each groove on the wall of the overflow chamber that is bordered by two axial fins has an intake area expanded in a direction of the opening edge for the at least one corresponding strip on the engagement skirt.

11. Metering and pouring device according to claim 9, wherein the at least one axial strip that is arranged on the peripheral surface of the engagement skirt has a partial area that tapers in a direction of its free end.

12. Metering and pouring device according to claim 11, wherein an annular sealing support projects in an axial direction from the inner top surface of the closure part, which support concentrically surrounds the engagement skirt and is located radially adjacent to the opening edge when the holding part, metering insert and closure part are assembled.

13. Metering and pouring device according to claim 12, wherein the rotationally-symmetrical holding chamber is closed on its axial end, facing away from the opening edge, with a chamber base, whereby a second chamber section connects to the inclined support surface of the inside jacket of the holding part, which section extends up to the chamber base and has a smaller inside diameter than the first chamber section; and
- wherein a side of the chamber base facing the chamber interior has a number of recesses that correspond to the number of the at least one passage windows, whereby each recess extends over an angular range that corresponds to a peripheral extension of each of the at least one passage windows in the inclined support surface; and
- wherein a number of radially-extending strips are arranged on an outside surface of the insert base of the metering insert that faces the chamber base, which number corresponds to the number of the at least one metering windows in the connecting surface, whereby in the assembled state of the holding part, metering insert and closure part, each strip is accommodated by a recess in the chamber base.

14. Metering and pouring device according to claim 13, wherein each recess in an end area of its peripheral extension has a locking projection, configured as a radial locking fin which projects from the base of the recess.

15. Metering and pouring device according to claim 14, comprising:
- wipers arranged on a bottom of the connecting surface of the metering insert, which faces the support surface of the holding part, in an area of the metering window.

16. Metering and pouring device according to claim 15, wherein the opening edge of the holding part is connected to a cylindrical outer skirt, which extends in a manner that is axis-parallel and concentric to the inside jacket and the outside wall of the outer skirt comprises:
- means for positive securing of the closure part that is equipped with corresponding engagement means.

17. Metering and pouring device according to claim 16, wherein the means for positive securing and corresponding engagement means are respectively a first threaded section arranged on the closure part and a corresponding second threaded section arranged on the outer skirt.

18. Metering and pouring device according to claim 17, wherein an inclination of the first and second threaded sections is configured in such a way that in the first position, the inner top surface of the closure part rests on the opening edge of the holding part.

19. Metering and pouring device according to claim 18, comprising:
- for radial and axial securing of the holding part on an inside wall of the outer skirt that faces the inside jacket of the holding part, anti-rotation devices and at least one means for axial securing for a mounting of the metering and pouring device on a container neck that is equipped with corresponding engagement means.

20. Metering and pouring device according to claim 19, wherein the holding part and/or the metering insert and/or the closure part are injection molded plastic parts.

* * * * *